United States Patent [19]

Fanuzzi

[11] Patent Number: 5,586,363
[45] Date of Patent: Dec. 24, 1996

[54] INDEXING HINGE

[76] Inventor: John M. Fanuzzi, Hwy. 89 Seven Point Ranch, Emigrant, Mont. 59027

[21] Appl. No.: 417,941

[22] Filed: Apr. 6, 1995

[51] Int. Cl.⁶ .......................... E05C 17/64; E05D 11/08
[52] U.S. Cl. .................. 16/342; 16/329; 16/331; 16/374; 16/386
[58] Field of Search ............. 16/328, 329, 330, 16/331, 332, 334, 344, 327, 386, 342, 374

[56] References Cited

U.S. PATENT DOCUMENTS

| | | |
|---|---|---|
| 521,429 | 6/1894 | Bessonette . |
| 704,982 | 7/1902 | Thorp . |
| 951,042 | 3/1910 | Augenbraun . |
| 963,069 | 7/1910 | Roots . |
| 1,534,758 | 4/1925 | Bartholomew . |
| 1,687,174 | 10/1928 | Mountford . |
| 2,375,118 | 5/1945 | Lesti . |
| 2,578,153 | 12/1951 | Schmitz ..................... 16/331 |
| 2,843,873 | 7/1958 | Slower ..................... 16/331 |
| 3,448,486 | 6/1969 | Wright . |
| 4,186,905 | 2/1980 | Brudy ..................... 16/342 |
| 4,580,829 | 4/1986 | Matheopoulos . |
| 4,666,328 | 5/1987 | Ryu . |
| 4,829,633 | 5/1989 | Kassner . |
| 5,168,601 | 12/1992 | Liu ..................... 16/329 |
| 5,265,969 | 11/1993 | Chuang ..................... 16/331 |

*Primary Examiner*—Chuck Y. Mah
*Attorney, Agent, or Firm*—Dennis A. Bennett

[57] ABSTRACT

There is disclosed a novel Indexing Hinge which rotates when a plunger is depressed and locks when the plunger is released.

13 Claims, 4 Drawing Sheets

INDEXING HINGE

BACKGROUND OF THE INVENTION

This invention relates to a hinge joint and more particularly to a quick indexing hinge.

In a conventional positioning hinge joint a cam pressure lock or screw is used to secure the hinge joint as desired specific angles. However, when the conventional joint is released the hinge is in a condition to "free fall." In order to set the hinge at a specific angel, the cam or screw must be tightened.

The present invention overcomes this problem by allowing the hinge to pivot when a plunger is depressed and is locked at a specific angel when the plunger is released.

SUMMARY OF THE INVENTION

According to the present invention, there is provided an indexing hinge, comprising:

a first sleeve having an interior surface;

a second sleeve, with an interior surface;

a plurality of longitudinal channels formed circumferentially in said interior surface of said second sleeve and extending substantially the length thereof;

a hollow shaft with a first end with at least one first opening on said first end and a second plurality of openings formed circumferentially along said second end of said shaft;

a lip on said second end of said shaft;

said first end of said shaft inserted thru said second sleeve until said lip engages said second sleeve and second plurality of openings on said shaft are aligned with said channels of said second sleeve;

said first sleeve inserted onto said first end of said shaft so to cover said first opening on said shaft and said shaft is non-rotatablly affixed to said first sleeve;

a plunger with a first and second end;

a first longitudinal channel formed on the outside of said first end of said plunger with at least one sloped side and a second longitudinal channel formed on the outside of said second end of said plunger;

said plunger inserted into said shaft so that said first longitudinal channel of said plunger is aligned with said second plurality of openings on said shaft and said second longitudinal channel of said plunger is aligned with said first opening on said shaft;

a first detent inserted into said second longitudinal channel of said plunger and thru said first opening on said shaft; and a second detent inserted into each of said second plurality of openings on said shaft.

It is an object of the present invention to provide an indexing hinge with an attached arm that pivots when plunger is depressed but to lock at a specific angel when the plunger is released.

It is an advantage of the present invention in that the indexing hinge is faster, safer, and/or more convenient than other hinges known in the art since screwing or tightening is not needed to lock the hinge at a specific angel.

Other features of the present invention will be apparent from the following detailed description taken in conjunction with the accompanying drawings.

DETAILED DESCRIPTION OF THE INVENTION

Figure 1:
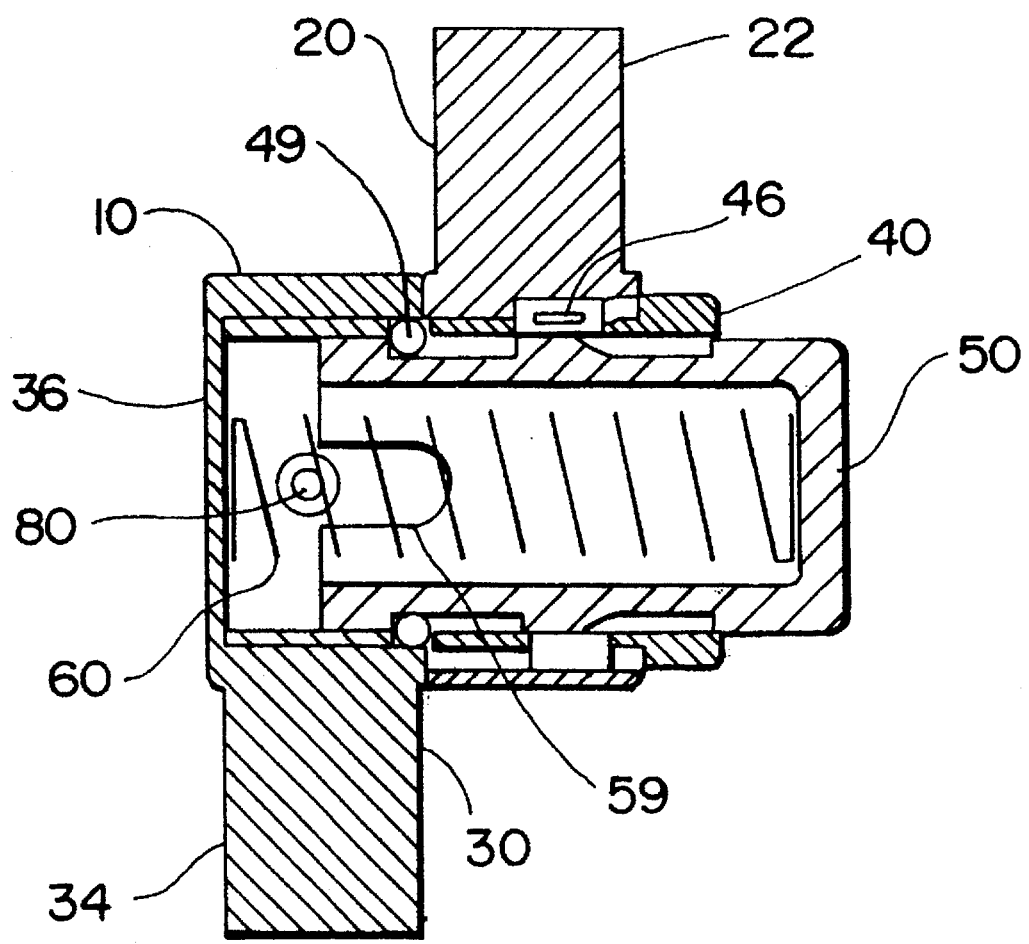
FIG. 1 is a sectional side view of the indexing hinge of the present invention.
Figure 2:
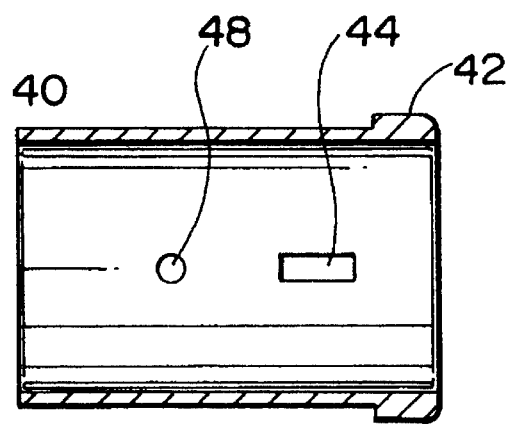
FIG. 2 is a side view of the shaft.
Figure 3:
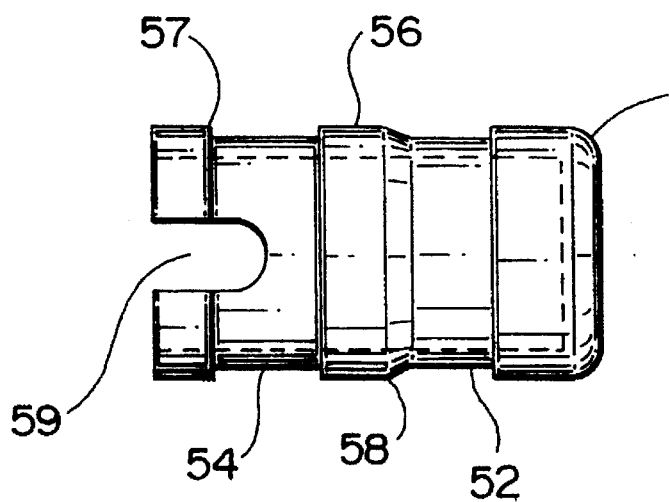
FIG. 3 is a side view of the plunger.
Figure 4:
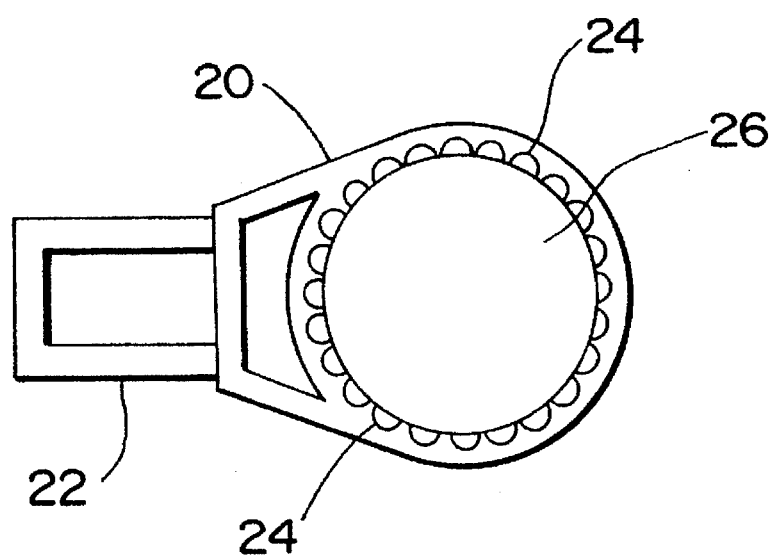
FIG. 4 is a side view of a sleeve with interior channels.
Figure 5:
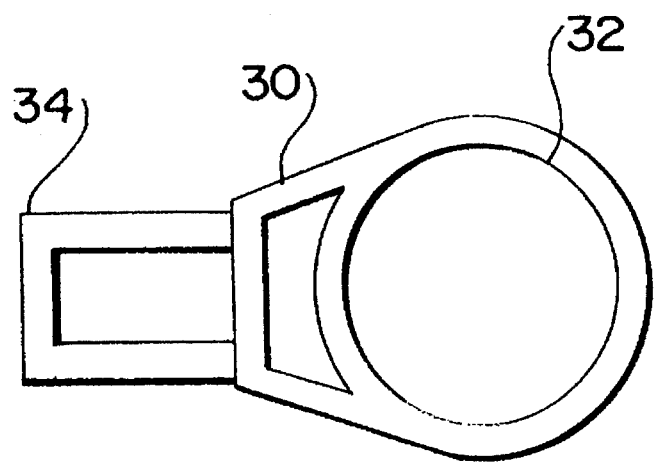
FIG. 5 is a side view of an end sleeve.

Referring to FIGS. 1–5 there is disclosed a preferred embodiment of the Indexing Hinge 10.

Sleeve 20 has an interior surface 26 with channels 24 spaced along the circumference of the interior surface 26. Preferably the channels are less than 180 degrees. This will allow the detents to fall out of the channels easier when the plunger is released. Sleeve 20 has an arm 22 attached. The sleeve 20 can be made up of two or more pieces connected together but is preferably an one piece infection molded plastic.

Another sleeve or end sleeve 30 has an interior surface 32 and an arm 34. It is preferred that sleeve 30 have an end cap 36. More preferably Sleeve 30 and end cap 36 are an one piece injection molded piece of plastic.

Shaft 40 is hollow and has a diameter smaller than the diameter of the interior surface of sleeves 20 and 30. At one end of shaft 40 is a lip 42 of a larger diameter than the diameter of the interior surface of sleeve 20. Along the circumference of shaft 40 are a plurality of openings 44. preferably evenly spaced around the circumference of shaft 40 and most preferred 4 evenly spaced openings. Into this space a bearing or pin 46 is inserted. The bearing or pin 46 is preferably longtidaual and made of stainless steel. Further, opening 48 is provided and inserted therein bearing 49. The shaft 40 is preferably injection molded plastic.

Plunger 50 has two channels 52 and 54. Channel 52 is at least as wide as bearing or pin 46. Between channel 52 and 54 is a ridge 56 with a slope side 58 in another embodiment slope 58 can be on the other side of channel 52. Still further both sides of channel 52 can have sloped sides.

Plunger 50 is inserted into shaft 40 so that opening 44 aligns with channel 52 and opening 48 aligns with channel 54. At least on grove 59 is cut out of plunger 50. Shaft 40 is inserted in sleeve 20 so that openings 44 aligns with channels 24 and lip 42 touches sleeve 40.

Pin(s) or detent(s) 46 are inserted into opening 44. To keep pins(s) 46 from falling out before assembling is complete shaft 40 is inserted into sleeve 20 so that opening(s) 44 are only partially covered by sleeve 20. Pins 46 are then inserted in at an angel. Once all the pin(s) 46 are put in the openings 44 shaft 40 is further inserted into sleeve 20 until lip 42 engages sleeve 20.

Channel 54 is aligned with hole 48. Groove s) 59 are preferably off center most preferred about 90 degrees off from hole 48. Two grooves 59 are preferred, however, one groove 59 will work.

Plunger 50 is preferably hollow to allow spring 60 to be inserted within it and spring 60 is long enough to extend out from plunger 50 to contact end cap 61. However, plunger 50 need not be hollow if the plunger is to be manually indexed or where spring 60 is to be compressed between end cap 61 and the second end of the plunger.

Shaft 40 is then inserted into sleeve 30 where spring 60 is compressed and the end of shaft 40 touches end cap 36. A Screw or rivet holds shaft 40 and sleeve 30 together. Groove 59 allows plunger 50 to avoid the screw or pivot 80. Shaft 40 could be glued to sleeve 30 thereby eliminating the need for screw 80 and groove(s) 59. In addition a bolt, rod or the like can be extended thru sleeve 30, shaft holes 48 and groves 39 and a nut attached to hold the bolt on. Bearing 49 will not fall out if grove 59 is not used such as when the sleeve 30 is glued to shaft 40. In this event the grove 59 is not needed not are the screws or bolts.

When the indexing hinge 10 is properly assembled bearing 49 rolls within channel 54 and passes thru hole 48. Bearing 49 is kept in place by sliding sleeve 30 over hole 48. Pins 46 do not engage channels 24 when plunger 50 is pushed into shaft 40. However, when no pressure is applied to plunger 50 spring 60 causes plunger 50 to be partially pushed out of shaft 40, bearing 49 engages ridge 57 and prevents plunger 50 from completely coming out of shaft 40. Pin(s) 46 are within channel 52 when plunger 50 is fully depressed. When plunger 50 is released pin(s) 46 are forced into a channel 24 by slope 58.

When screw or rivet 80 is used to hold sleeve 30 to shaft 40 the screw 80 should be long enough to go thru groove 59 thereby preventing plunger 50 from rotating in use and allowing bearing 49 from falling out into plunger 50.

Figure 6:
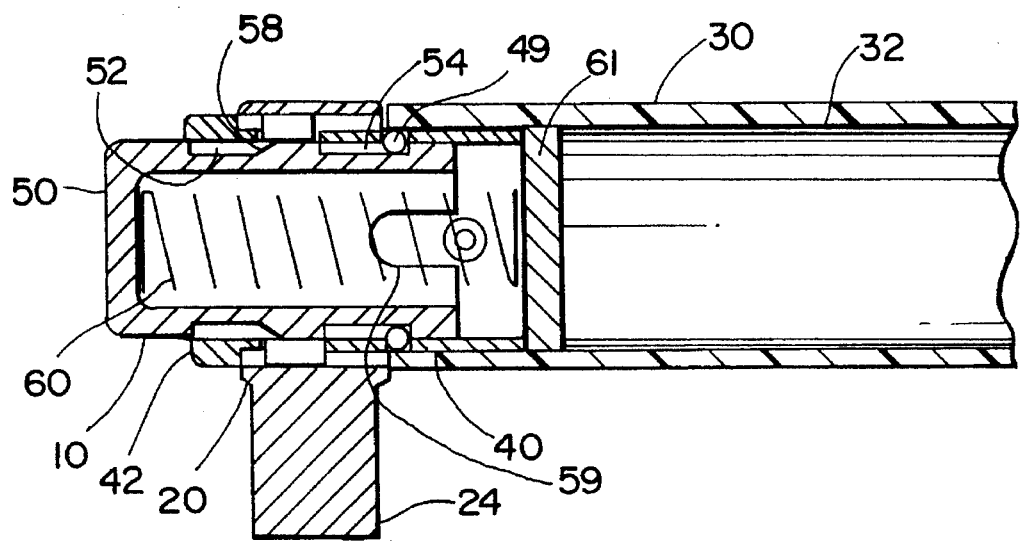
FIG. 6 is a side view of another embodiment of the Indexing Hinge.

In another embodiment of the present invention FIG. 6 discloses the indexing hinge 10 with sleeve 30 without arm 34. Sleeve 30 is a round tube or the like preferably having stopper 61 inside of it so spring 60 can compress against it when plunger 50 is indexed or pushed. As above the hinge need not have stopper 61 or spring 60 instead plunger 50 can be manually indexed in and out of shaft 40.

Figure 7:
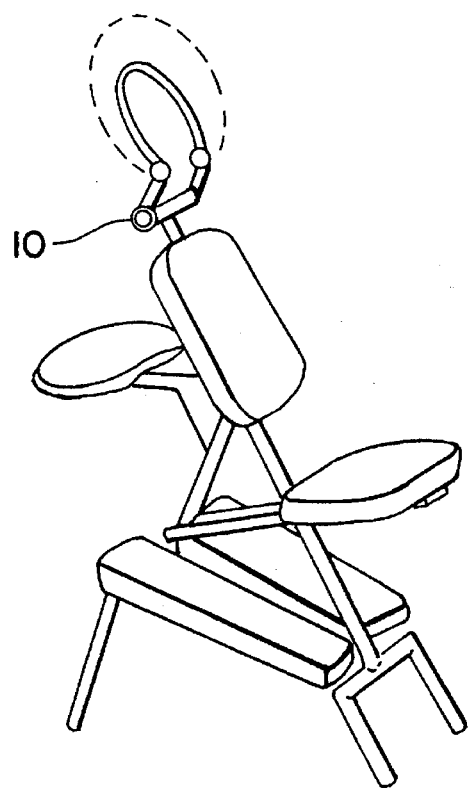
FIG. 7 is the present invention in use.

The present invention is suitable for use in tilting face support for therapy tables and chairs as shown in FIG. 7, light stands, musical stands, ladders portable computer screen hinges, tools and the like.

As discussed above, another embodiment of the indexing hinge, the indexing hinge is not spring loaded but has a positive on or off that does not necessarily retract to the locked position. The plunger is manually indexed in and out of shaft 40 to either having 49 engage or not engage channels 24.

In the preferred embodiments the parts are injection molded out of plastic, however, the parts can be machined or stamped out of aluminum or other metals if the application to which the hinge 10 will be used requires the hinge 10 to handle lower or higher torque.

In still another embodiment sleeve 30 is attached directly to some torque resisting surface like a lab bench thereby eliminating the need for arm 34. Screws could be inserted thru end cap 36 and screwed directly into a surface.

As used herein pin(s) bearings or the like are used to allow the parts to move or stop as taught and it is understood that any detent will work. However, as taught above pins and bearings are preferred in the hinge.

From the foregoing it can be seen that the present invention provides an improved indexing hinge which insures safety in use while being easy to operate. Clearly, many modifications and variations of the invention are made possible in the light of the above teachings. It is therefore to be understood that, within the scope of the appended claims, the invention may be practiced otherwise then as specifically described.

What is claimed is:

1. An indexing hinge, comprising:

a first sleeve having an interior surface;

a second sleeve, with an interior surface;

a plurality of longitudinal channels formed circumferentially in said interior surface of said second sleeve and extending substantially the length thereof;

a hollow shaft with a first end and a second end with at least one first opening on said first end and a second plurality of openings formed circumferentially along said second end of said shaft;

a lip on said second end of said shaft;

said first end of said shaft inserted thru said second sleeve until said lip engages said second sleeve and second plurality of openings on said shaft are aligned with said channels of said second sleeve;

said first sleeve inserted onto said first end of said shaft so to cover said first opening on said shaft and said shaft is non-rotatablly affixed to said first sleeve;

a plunger with a first end and a second end;

a first circumferential channel formed on the outside of said first end of said plunger with at least one sloped side and a second circumferential channel formed on the outside of said second end of said plunger;

said plunger inserted into said shaft so that said first circumferential channel of said plunger is aligned with said second plurality of openings on said shaft and said second circumferential channel of said plunger is aligned with said first opening on said shaft;

a first detent inserted into said second circumferential channel of said plunger and thru said first opening on said shaft; and a second detent inserted into each of said second plurality of openings on said shaft.

2. The Indexing Hinge as recited in claim 1 further comprising an arm attach to said first sleeve.

3. The Indexing Hinge as recited in claim 1 wherein said first sleeve has an end cap.

4. The Indexing Hinge as recited in claim 3 further comprising a spring between said plunger and said end cap.

5. The Indexing Hinge as recited in claim 1 wherein said plunger has at least one grove formed on said second end and is off center with said first opening on said shaft.

6. The Indexing Hinge as recited in claim 5 wherein said first sleeve has an attachment means that passes thru said first sleeve, said shaft and into said grove of said plunger.

7. The Indexing Hinge as recited in claim 1 wherein said second detent is a pin.

8. The Indexing Hinge as recited in claim 1 wherein said first detent is a bearing.

9. An indexing hinge, comprising:

a first sleeve, having an interior surface, an end cap and an attached arm;

a second sleeve, with an interior surface, having an attached arm:

a plurality of longitudinal channels formed circumferentially in said interior surface of said second sleeve and extending substantially the length thereof;

a hollow shaft with a first end and a second end with at least one first opening on said first end and a second plurality of openings formed circumferentially along said second end of said shaft;

a lip on said second end of said shaft;

said first end of said shaft inserted thru said second sleeve until said lip engages said second sleeve and second plurality of openings on said shaft are aligned with said channels of said second sleeve;

said first sleeve inserted onto said first end of said shaft so to cover said first opening on said shaft and said shaft is non-rotatable affixed to said first sleeve;

a hollow plunger with a first end and a second end where said first end is capped and said second end is open;

a spring inside said plunger that touches said first end of said hollow plunger, extends out of said second end of said hollow plunger and contacts said end cap of said first sleeve;

a first circumferential channel formed on the outside of said first end of said plunger and a second circumferential channel formed on the outside of said second end of said plunger said first circumferential channel having a sloped side between said first circumferential channel and second circumferential channel;

Said plunger inserted into said shaft so that said first circumferential channel of said plunger is aligned with said second plurality of openings on said shaft and said second circumferential channel of said plunger is aligned with said first opening on said shaft;

a first detent inserted into said second circumferential channel of said plunger and thru said first opening on said shaft; and a second detent inserted into each of said second plurality of openings on said shaft.

10. The Indexing Hinge as recited in claim 9 wherein said plunger has at least one grove formed on said second end and is off center with said first opening on said shaft.

11. The Indexing Hinge as recited in claim 10 wherein said first sleeve has an attachment means that passes thru said first sleeve, said shaft and into said grove of said plunger.

12. The indexing Hinge as recited in claim 9 wherein said second detent is a pin.

13. The Indexing Hinge as recited in claim 9 wherein said first detent is a bearing.

* * * * *